Dec. 25, 1934.                S. GALL                    1,985,564
                          SAUSAGE CASING
                        Filed Dec. 30, 1930

Stanley Gall,
INVENTOR.

BY J. Stanley Burch
ATTORNEY.

Patented Dec. 25, 1934

1,985,564

UNITED STATES PATENT OFFICE 1,985,564

SAUSAGE CASING

Stanley Gall, Cincinnati, Ohio

Application December 30, 1930, Serial No. 505,634

1 Claim. (Cl. 17—45)

It is the object of the present invention to provide a sausage casing composed of inner and outer layers of material of relatively different thickness, and to secure the adjacent edges of the same together in a novel manner to provide a reinforced leak-proof joint at the opposite sides of the casing.

In carrying out the invention I provide a casing of the above-mentioned character wherein a binding strip of suitable material is folded over the adjacent longitudinal edges of the respective layers of the casing, and stitched thereto in a manner to materially reinforce the casing at opposite sides and also to provide a sealed joint therefor.

The invention will be better understood when the following detailed description is read in connection with the accompanying drawing, the invention residing in the construction, combination and arrangement of parts as claimed.

In the drawing forming part of this application like numerals of reference indicate similar parts in the several views and therein:

Figure 1:
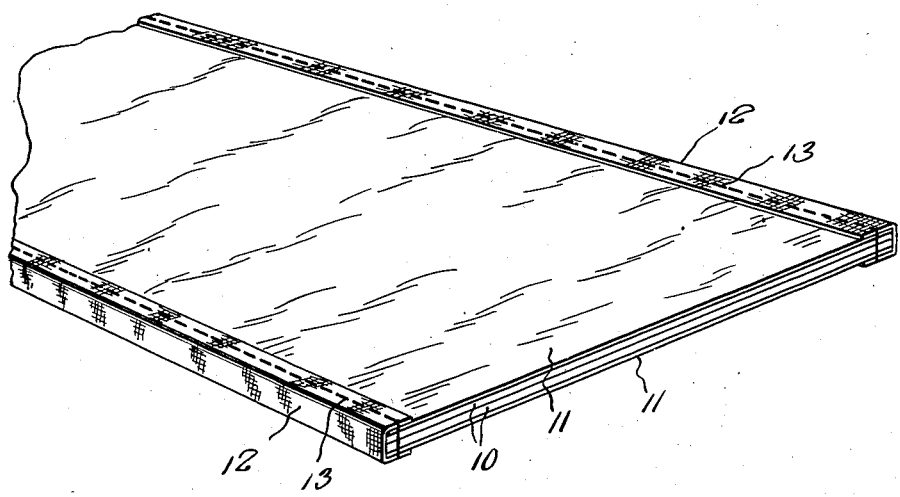
Figure 1 is a fragmentary perspective view of the casing constructed in accordance with the present invention.

In accordance with the present invention, the casing is composed of inner and outer layers of material of relatively different thickness, the material being preferably hog bung and beef round. In Figure 1 of the drawing 10 represents two relatively thick layers of hog bung, which are arranged between two relatively thin but strong tough layers of beef round indicated at 11. All of these layers are of the same area so that the adjacent longitudinal edges thereof are arranged flush, to permit the edges to be joined together in a manner to be presently described, and with a view of providing a strong reinforced leak-proof joint between the layers.

Figure 2:
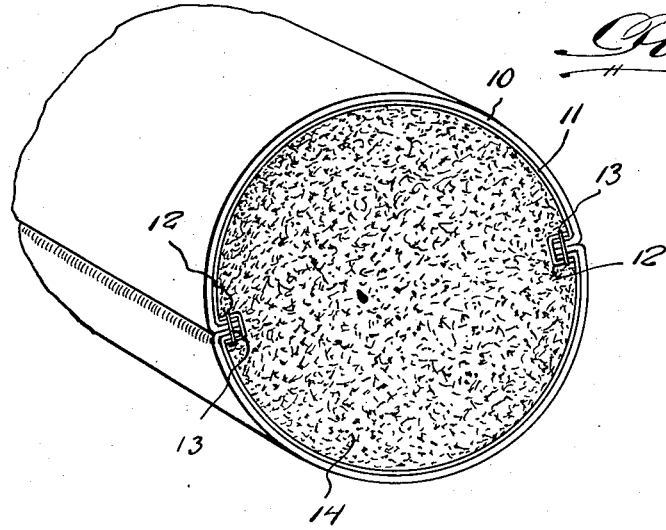
Figure 2 is a similar view showing how the casing is used.

For this purpose I preferably employ a binding strip of suitable material indicated at 12, there being one of these strips arranged at each side of the casing as illustrated in Figure 1, and of a width to embrace the adjacent longitudinal edges of the respective layers 10 and 11 of the casing. After each strip 12 has been folded over the adjacent longitudinal edges of the layers of the casing, the same is stitched through said layers as indicated at 13, and the casing is subsequently turned inside out as clearly illustrated in Figure 2, and then filled with its product indicated at 14. When the casing is turned inside out for use as illustrated in Figure 2, it will be noted that the adjacent marginal edges of the respective layers together with the binding strip 12 project within the casing, and therefore not only provides the latter with strong reinforced joints, but one which will positively prevent leakage or escape of the material 14 from the casing through the joints. The invention is also very simple in construction and can be manufactured at a nominal cost.

While it is believed that from the foregoing description the nature and advantages of the invention will be readily apparent, I desire to have it known that I do not limit myself to what is herein illustrated and described, and that such changes may be resorted to when desired as fall within the scope of what is claimed.

What I claim as new is:

A sausage casing comprising opposed walls of uniform width throughout, the longitudinal edge portions of said walls being turned inwardly, a strong binding strip snugly folded around the adjacent longitudinal edges of both walls and upon the inturned longitudinal edge portions thereof at each side of the casing, and stitching extending through the inturned longitudinal edge portions of both walls and through the longitudinal edge portions of the binding strip at each side of the casing to provide concealed leak-proof joints between the longitudinal edge portions of said walls.

STANLEY GALL.